United States Patent [19]

Caisley

[11] E Re. 30,876

[45] Reissued Mar. 2, 1982

[54] JACKING ASSEMBLY

[76] Inventor: Jack B. Caisley, 99 Swift St., Ballina, NSW 2480, Australia

[21] Appl. No.: 83,729

[22] Filed: Oct. 10, 1979

Related U.S. Patent Documents

Reissue of:

[64] Patent No.: 4,056,256
Issued: Nov. 1, 1977
Appl. No.: 683,142
Filed: May 4, 1976

[30] Foreign Application Priority Data

May 5, 1975 [AU] Australia ..... PC1474
May 5, 1975 [AU] Australia ..... PC1475
May 5, 1975 [AU] Australia ..... PC1477
Feb. 27, 1976 [AU] Australia ..... PC5029

[51] Int. Cl.[3] ..... B66F 1/00
[52] U.S. Cl. ..... 254/106
[58] Field of Search ..... 254/89 H, 93 HP, 105–111

[56] References Cited

U.S. PATENT DOCUMENTS 2,673,064 3/1954 Patterson et al. ..... 254/106
3,172,166 3/1965 Imbrecht ..... 254/93 HP
3,305,217 2/1967 Wijgengangs ..... 254/93 HP
3,924,843 12/1975 Hirmann ..... 254/93 HP

FOREIGN PATENT DOCUMENTS 1003025 9/1965 United Kingdom .
1175767 12/1969 United Kingdom .

*Primary Examiner*—Robert C. Watson

[57] ABSTRACT

A jacking assembly for moving a load, in steps, axially of a pipe comprises two pawl boxes having lateral platens and which are mounted at axially spaced positions on the pipe. The pawls of the boxes slope towards the pipe and exert a grip on it which allows relative movement between the boxes and the pipe to occur in one direction only. Inflatable hoses connected to a low pressure water supply are sandwiched between the platens and exert a thrust, when dilated, which increases non-linearly with water pressure, to move whichever of the pawl boxes is carrying the load. This movement, which provides the working stroke, is followed by a recovery stroke during which the pawl box not carrying the load is moved up to the other pawl box under the action of springs or a second inflatable hose. The assembly is able to lift a heavy load with a low pressure water supply and has no moving seals. Its operation in parallel with other such assemblies is also described for house building and slip forming purposes.

16 Claims, 23 Drawing Figures

JACKING ASSEMBLY

Matter enclosed in heavy brackets [ ] appears in the original patent but forms no part of this reissue specification; matter printed in italics indicates the additions made by reissue.

FIELD OF THE INVENTION

This invention relates to a jacking assembly for moving a load, in steps, lengthwise of an elongated member such as a bar, and which is capable of being operated hydraulically with other jacks. Such jacking assemblies are useful in house construction and in slipforming.

STATE OF THE ART

Australian Pat. No. 261,151 discloses a jacking assembly as described above. It utilises two independently moveable gripping parts which each engage the bar and are capable of being slid in one direction only, along it. Movement of the gripping parts in the reverse direction under the action of the thrust of the load, is prevented by sets of teeth which bite into the wall of the bar under the thrust of the load. Pairs of hydraulic rams constructed as piston and cylinder units, are connected between the two gripping parts and are expanded to advance one gripping part, and thus the load, and are then retracted to draw the other gripping part towards the advanced gripping part. For each cycle of operation of the hydraulic rams the jacking assembly advances one step along the bar.

Jacking assemblies as described above are used in slip-forming and can also be used, when connected hydraulically in parallel, to lift heavy loads such as concrete slabs. However such jacking assemblies are relatively expensive and require costly ancilliary equipment.

The expense of the jacking assembly stems, in part, from the piston and cylinder units used. The fitting of a piston in a cylinder necessitates close manufacturing tolerances and the use of expensive moving piston seals. If a number of such assemblies are operated in parallel the failure of a seal in one of the hydraulic units results in the lifting operation being held up until the defective unit is repaired or replaced. As the site of use may be remote from repair facilities, the failure of a seal is a serious matter and high quality seals and a high standard of maintenance of the units are essential.

A further factor which increases the cost is the relative complexity of the piston and cylinder units. During lifting of a heavy load by a number of such units operated in parallel, it is usual for the load to be unevenly distributed amongst the jacking assemblies. This results in some of the hydraulic units reaching the ends of their strokes before others. The increase in pressure in the hydraulic system necessary to ensure that all of the units execute the same length of stroke, has to be bypassed from the units which have already completed their strokes as otherwise they could be seriously damaged. This by-passing is achieved by providing the units with valves which close when the end of the stroke is reached to isolate the cylinder of the unit from a further pressure increase. Were this not done the stops which limit the piston stroke could be strained. The provision of such valves and by-pass facilities increases the cost of the units.

A further reason why such units are expensive is that the manufacturing cost of a unit increases rapidly with its size because the length of the costly piston seal and thus the likelihood of it failing, also increases with the diameter of the unit. For these reasons, quite apart from considerations of weight and compactness, fluid pressure-operated jacking assemblies are always used in conjunction with high pressure hydraulic systems which normally operate at pressures of 800 pounds per square inch or above. This entails the use of specially constructed pressure pumps and high pressure lines as well as expensive piston seals.

Despite the above disadvantages hydraulically operated jacking assemblies have found wide acceptance on building sites. However damage to the moving seals of the piston and cylinder units by abrasive dirt which is always present on a building site, is commonplace and has hitherto been regarded as an unavoidable disadvantage which has to be accepted if hydraulically operated jacking assemblies are to be used.

OBJECT OF THE INVENTION

An object of this invention is the provision of an improved jacking assembly capable of being used with others to lift large loads.

THE INVENTION

In accordance with the present invention [a fluid-pressure operated jacking assembly for moving a load, in steps, comprises;]

[a. two gripping parts adapted to be mounted at axially spaced positions on the member,]

[b. gripping devices mounted on each part and which grip the member in a way which allows relative axial movement in one direction only between the member and the parts,]

[c. fluid-pressure operated thrusting equipment for forcibly separating the two parts in response to the admission of a fluid under pressure to the equipment during a working stroke, and]

[d. means for forcing the two parts towards one another to execute a recovery stroke which follows the working stroke; in which assembly said equipment incorporates a flexible, inflatable, but non-elastic bag shaped progressively to reduce its area of contact with the two parts as it dilates so that the ratio of thrust to fluid pressure diminishes as the two parts of the assembly move apart. The bag is preferably a hose section having its longitudinal axis lying in a plane which is perpendicular to the direction of the axis of the member conveniently formed by a pole or pipe.] *a fluid operated jacking assembly suitable for moving a load, in steps, axially of an elongate member having a substantially constant cross-section the assembly comprising:*

*said elongate member, two parts adapted to be slidably mounted at axially spaced positions on the member;*

*pawl devices mounted on each of said parts and engagable with the elongate member in a way which permits relative axial movement in one direction only between the elongate member and said parts;*

*fluid-pressure operated means for forcibly separating the two parts in response to admission of a pressurised fluid to said means during a working stroke, and means comprising a least one inflatable bag located between and in contact with the two parts and, in operation of the jacking assembly, adjacent the elongate member, the bag being flexible but non-elastic so that the area of contact of the bag with the two parts diminishes progressively with increasing admission of*

*pressurised fluid and consequential dilation of the bag and, recovery means for forcing the two parts towards one another to execute a recovery stroke following the working stroke and release of fluid pressure from said fluid pressure operated means.*

PREFERRED FEATURES OF THE INVENTION

When the jacking assembly is operating, the thrust produced by the expanding bag causes movement of one of the two parts and, during the subsequent contraction of the bag, the other of the two parts is moved [up to] *towards* the first part by the [retraction] *recovery* means which may [be] *act by* gravity, a resilient spring, or a second inflatable bag which is operated alternatively with the first bag and acts between the two parts but in the opposite sense (on each part) to the first bag.

The jacking assembly in one construction draws one pipe out of another so as to produce a telescopic strut. By turning the assembly upside down, it may be used to climb the member.

The advantages of the invention is that no moving seals are used and low fluid pressures in the range 28 p.s.i. *to* 160 p.s.i. are possible. The bag which operates the assembly simply inflates and then deflates and, if it is constructed as a hose which assumes a circular cross-section when dilated, the upward jacking thrust is a function of the hose length and dilation. [When the jacking assembly is operated in parallel with other jacking assemblies to lift a load, the increase in thrust exerted by each jacking assembly diminishes in accordance with the inflation of the flexible bag.] *Thus, in order to lift a load with the jacking assembly, an increase in hydraulic pressure within the bag must be provided to offset the smaller contact area caused by dilation of the bag.* This stems from the fact that the more the bag is inflated, the less becomes the areas of it in contact with the two parts and which are urging them apart. A number of such jacks operating in parallel exhibits a self-levelling ability automatically without requiring bypass valves and without straining stroke-limiting stops because the bags can be designed to have a high bursting strength and can, if required, be fitted inside one another to increase the bursting strength still further. When one bag is fully dilated under load, the fluid pressure—either pneumatic or hydraulic—applied to it, can be increased substantially without *significantly* increasing the upward thrust [of the] *provided by the* jacking assembly. The stroke lengths of all of the jacking assemblies can [therfore] *therefore* be maintained *relatively* constant over *a* wide fluid pressure range. A further advantage of the jacking assembly is that its upward thrust can be increased or diminished by adjusting the areas of the two parts in contact with the bag. If the bag is in the form of a hose length sandwiched between platens on the two parts, the adjustment can be effected by [placing a washer between the two parts or by] simply changing the dimensions of the platens in contact with the hose. They may, for example, be provided with sliding ends which enable the lengths of the platens to be [foreshortened] *adjusted.*

The devices for allowing relative movement axially of the elongated member conveniently comprise pawls which are inclined to the axis of the elongated members and bite into it. The other ends of the pawls are hinged slackly to the jacking assembly in a way which allows the pawls to slew slightly if the jacking assembly is turned around the pipe. Preferably a simple abutment hinge is used. This allows the jacking assembly to be moved in the direction normally resisted by the pawls, provided that such movement is accompanied by rotation of the jacking assembly which causes the pawls to slew slightly. Controlled lowering of the assembly is therefore possible without the risk of injury to the personnel handling it.

Conveniently the pawls are provided with switch arms accessible outside of the jacking assembly and which allow the pawls to be moved out of engagement with the pipe or other member. This enables the load to 'float' on the bags when the switch arms of one part are operated and the bags are dilated.

For lifting very heavy loads, a symmetrical arrangement of four pawls in each of the two parts may be used. If only one pair of opposed pawls is used in each part, there can be a tendancy for the pawls to bend the cross-section of the pipe into an oval. A cruciform configuration counteracts this tendancy.

One may also fill the pipe of the assembly engaged by the pawls with concrete to increase its overall strength to resist bending as well as its resistance to inward deformation. This can be done [at] *on* site so that the pipe is transported while hollow and therefore light. A concrete filled metal pipe is naturally also cheaper *to construct* than a solid [one to construct] *metal one.*

[The] *Preferred forms of the* invention will now be described in more detail, by way of examples with reference to the accompanying drawings:

IN THE DRAWINGS

*FIG. 16 shows characteristic curves for a typical jacking assembly in accordance with the present invention*

FIG. [19] *17* shows a stage in the raising of a concrete factory roof.

FIG. [20] *18* shows how a roof may be lifted, one side at a time;

FIG. [21] *19* shows how a pole, formed by a mild steel pipe, of a climbing jack also made out of mild steel, can be stiffened by associated scaffolding;

FIG. [22] *20* shows various ways of lifting a concrete roof;

FIG. [23] *21* shows an expandible platen usable in the jacking assembly;

FIG. [24] *22* shows how two bags can be used respectively to expand and contract the jacking assembly; and, FIG. [25] *23* shows how two jacking assemblies fixed together back to back and one reversed with respect to the other, can be used to pull slip-formers up around a pipe and then, after fixing the jacking assemblies, the pipe can be pulled up with respect to the slip-formers.

In the accompanying drawings of the different embodiments, corresponding parts are similarly referenced, the reference being identified from one another by suffixes. Parts bearing corresponding references, but with different suffixes are to be understood as operating similarly and their description is not therefore repeated in detail.

PREFERRED EMBODIMENT

Figure 1:
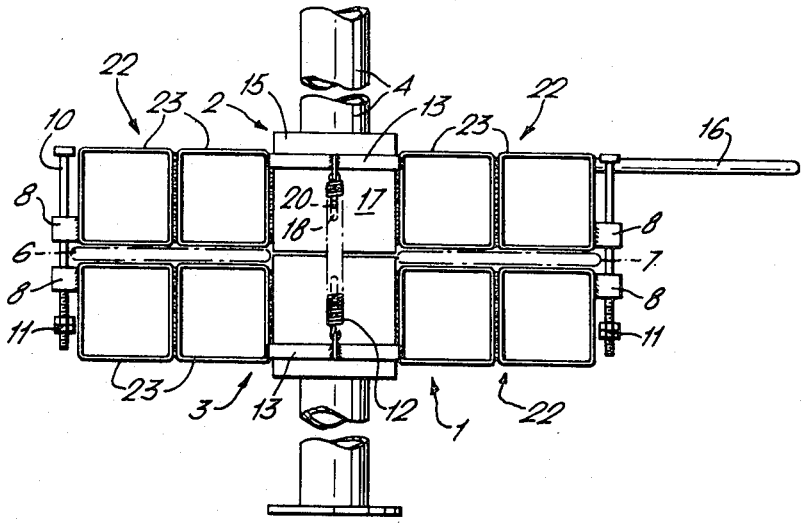
FIG. 1 is a front view of a jacking assembly for climbing a pipe which is shown partially broken away, the position of bags or hoses in the assembly being shown in dotted outline in their collapsed condition.

The jacking assembly 1 shown in simplified form in FIG. 1 comprises an upper part 2 and a lower part 3 which are mounted on a steel pipe 4. The parts 2 and 3 have mounted between them two short sections of hose 6 and 7 which are shown in the collapsed condition and which are made from flexible non-elastic plastics material. The hoses 6 and 7 are connected hydraulically in parallel and can be dilated by filling them with water under pressure. As the hoses expand, they assume a flattened cylindrical configuration, and push the two parts 2 and 3 of the jacking assembly apart. This separation movement is guided by side lugs 8 arranged in pairs at each side of the jacking assembly and which have aligned bores through which steel bolts 10 are a slack fit. Lock nuts 11 on the ends of the bolts 10 determine the extent of the separation of the two parts of the jacking assembly. Separation of the two parts 2 and 3 occurs against the resilience of a pair of coil springs 12 located, respectively, one at each end of the assembly and connected at their ends to brackets 13 fixed respectively to the two ends of each part of the assembly.

The upper and lower parts 2 and 3 of the jacking assembly are identical, apart from the provision of a lateral arm 16 on the upper part, and thus one part 2 only will be described.

The upper part 2 comprises a pawl box 15 of square cross-section and which is closed at its ends by plates 17 each of which contains an upright slot 18, from which projects a pawl switch arm 20. The centre of the pawl box is provided with a vertical circular hole 21 *(FIG. 3)*, which is a clearance fit around the periphery of the pipe 4 which passes through it.

At each side of the pawl box 15 is a platen 22 comprising two tubes 23 of square cross-section which are welded to one another and to the side wall of the pawl box 15. As is clearly shown in FIG. 1, when the pawl boxes of the upper and lower parts 2 and 3 of the jacking assembly are touching one another their platens 22 are spaced slightly so that the hoses 6 and 7 are not squashed between them.

Figure 4:
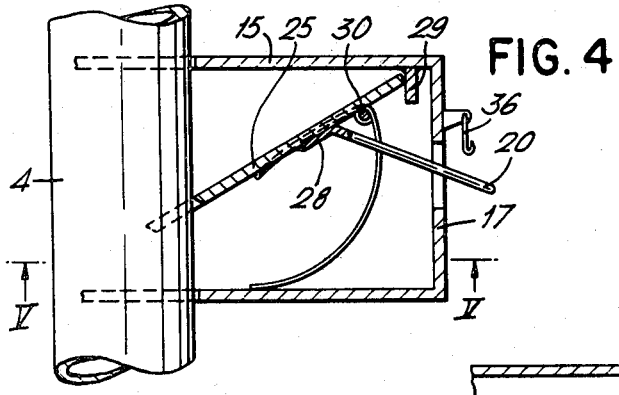
FIG. 4 is a fragmentary cross-section through FIG. 3, taken on the line and in the direction indicated by the arrows IV—IV in FIG. 3.

Each pawl box houses a pair of pawls one of which is shown in FIG. 4 and referenced 25. These pawls slope inwardly and downwardly towards the central region of the pawl box and they have their adjacent ends shaped to provide a sharp circular edge 26, which, apart from its end-portions 27, is complementary to the surface of the pipe 4 when the pawl is in the position shown in FIG. 4. The end portions of the edge 26 are cut across as shown at 27. The switch arm 20 of the pawl is welded to an intermediate position 28 on its [upper] *under* surface, and the end of the pawl opposite the pipe 4 nests in a corner provided between an abutment wall 29 welded to the inside of the pawl box 15 and the pawl box roof to provide an abutment hinge.

Each pawl 25 has welded to it at an intermediate position a transverse pin 30. The ends of the pin 30 project beyond the side of the pawl 25, but terminate short of the side walls of the pawl box 15. The projecting ends of the pin 30 provide supports for respective coiled portions of a wire spring 31. The intermediate portion of this spring extends across the under face of the pawl 25 from the pin 30, and its end portions are bowed downwardly and forwardly inside the pawl box so that they engage its floor and thereby urge the pawl 25 against the pipe 4. The pawl 25 may be moved away from the pipe 4 by lifting the pawl arm 20 and a catch 36 is provided on the plate 17 of the pawl box to hold it in its lifted position.

Figure 6:
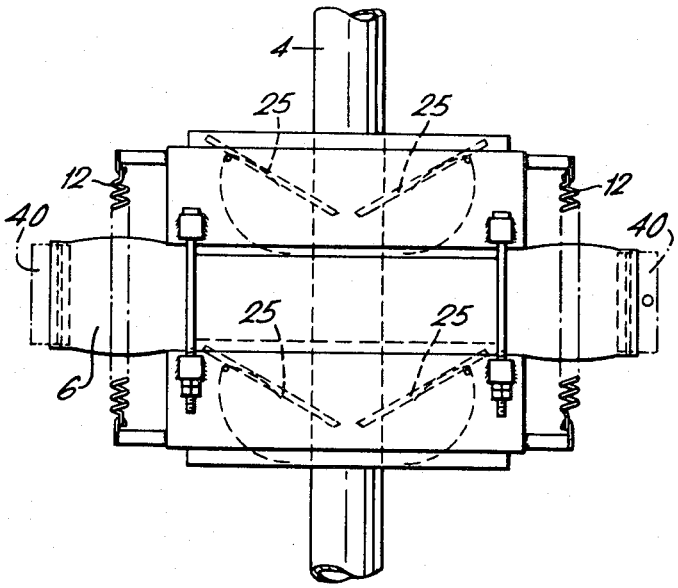
FIG. 6 shows the jacking assembly of FIG. 2 in more detail and with the hoses expanded.

The two diametrically arranged pawls 25 in the pawl box are as clearly shown in FIG. 6. These pawls allow each of the two parts 2, 3 of the jacking assembly to ascend the pipe 4 but bite into the wall of the pipe to resist its descent. The greater the load on the jacking assembly, the greater is the force tending to keep the pawls in contact with the pipe 4. In practice, the angle made by the pawls with the pipe 4 can be varied and is normally about 30° to the horizontal.

Figure 3:
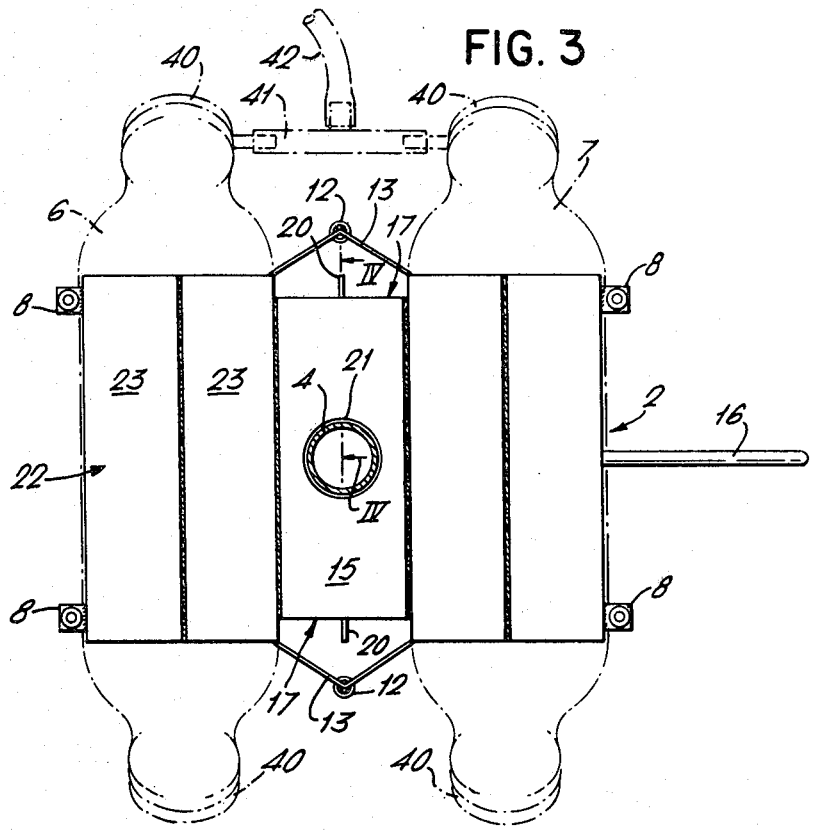
FIG. 3 is a plan view of FIG. 1, the end portions of the hoses together with some pipe connections between them being shown in broken outline.

Reverting to FIG. 3, the two hoses 6 and 7 are closed at their ends by being clamped to the periphery of cylindrical metal cups 40. The cups 40 at one end of the jacking assembly are connected by a branch pipe connection 41 having a T-junction in it to allow water under pressure of 100lbs. p.s.i. to be admitted by way of a flexible conduit [41] *42.*

OPERATION OF PREFERRED EMBODIMENT

The operation of the jacking assembly will now be described.

Figure 2:
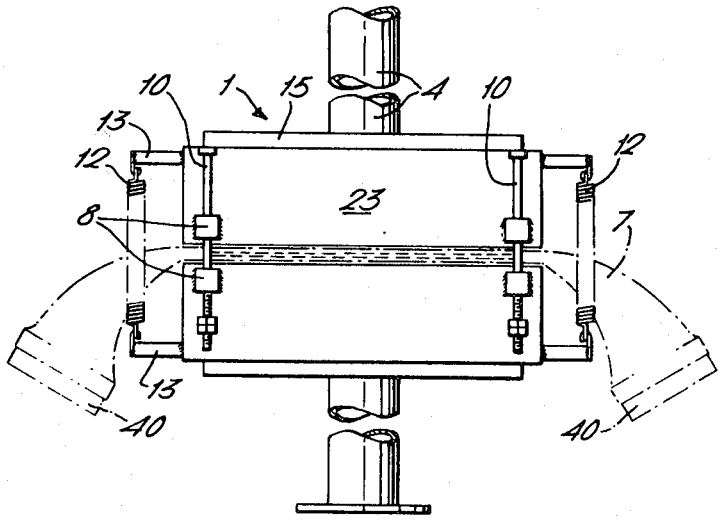
FIG. 2 is a side view of FIG. 1.

The jacking assembly 1 of FIG. 2 carries [the weight] *a load* which is to be lifted in steps up the pipe 4 and the downward [thrust of the weight] *force due to the load* is resisted by the two sets of pawls 25 which slope downwardly and have their lower [cuved]

*curved* ends pressed tightly against the wall of the pipe 4 with a force proportional to the load on the jacking assembly.

Water at 100 lbs. p.s.i. pressure is admitted to the hoses 6 and 7 to expand them. As they are arranged one each side of the pipe 4 their expansion exerts a balanced thrust tending to separate the two parts 2 and 3. As the lower part 3 is prevented by its pawls 25 from moving downwardly, the upper part 2 is forced up the pipe and the lower edges of its pawls 25 within the pawl box 15 trail against the surface of the pipe 4.

As the hoses expand, their surface areas in contact with the platens diminish. This is apparent from FIG. 9 which shows in the left-hand sketch a fully dilated hose 6 in section and in the right hand sketch a half dilated hose. The upward thrust is a function of the hydraulic pressure P inside the hose and its area in contact with the platens 22. In the case of the left-hand sketch this area is referenced a which is less than the corresponding area b in the right hand sketch. [The rate of increase of the upward thrust of the jack therefore diminishes as its stroke increases.] *Therefore, in order to lift a load with the jacking assembly, an increase in hydraulic pressure within the bag must be provided to offset the smaller contact area caused by dilation of the bag.* The length of the stroke is determined by the extent to which separation of the two parts 2 *and* 3 is permitted by the positions of the lock nuts 11 on the guide bolts 10. It can also be adjusted by introducing a plate of the appropriate thickness on the surfaces of the two lower platens 22, so that the hoses 6, *and* 7 lie on the plate which effectively reduces the spacing between each pair of platens.

At the end of the upward movement of the upper part 2 of the jacking assembly, the hydraulic pressure in the hoses is reduced, and, as is clear from FIG. 6, the load [of] *supported by* the jacking assembly is carried by the upper pair of pawls 25. The lower part 3 of the jacking assembly now carries no load and the coil springs 12 draw it upwardly beneath the upper part 2. This is accompanied by expulsion of the water from the hoses 6 and 7. The pawls 25 associated with the lower part 3 trail against the wall of the pipe 4 during this upward movement.

In the above cycle of movement, the jack may be advanced about 2½ inches while carrying a load of 6 tons and using two hoses each of which has a width measured horizontally of 15 centimeters and a length of 38 centimeters. The hose is made of non-elastic fabric-reinforced flexible plastics material and its end portions are turned back on themselves and held on each cup 40 so that a [self-sealing] *sealed* connection is made. The hosing material is marketed in Australia under the trade name "stay flat" or "roll flat". The jacking assembly can be stepped up the pipe of FIG. 6 indefinitely. In the unlikely event of one pair of pawls failing, the other pair of pawls is capable of carrying the weight so that there is 100% safety factor built into the jacking assembly. The maximum distance a load can drop as a result of the failure of one pair of pawls, is the separation distance of the two pawl boxes 15. This can be adjusted to suit the load. In practice if such a set of pawls is not sufficiently sharp to grip the pipe, it slips at the beginning of a lift and this is immediately noticed by the apparent failure of the jacking assembly to operate. The pawls can then be replaced.

At the end of the lift, the weight of the load can be transferred to a suitable support and the jacking assembly lowered down the pipe 4. The two sets of pawls resist this lowering as the weight of the assembly is about 50 lbs so that, if allowed to fall freely, it could be dangerous. However, free fall of the jacking assembly cannot take place unless both pairs of pawls are moved out of engagement with the pipe 4. This is possible by raising both of the pawl switch arms 20 (see FIGS. 4 and 5) but this would not be done in normal circumstances as it is preferable to have controlled lowering of the jacking assembly.

Figure 5:
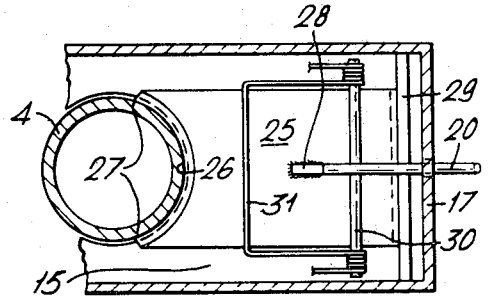
FIG. 5 is a cross section through FIG. 4, and taken in the direction indicated by the arrows V—V in FIG. 4.

Controlled lowering of the assembly is possible because of the way in which the pawls 25 are mounted in the pawl boxes 15. Turning to FIG. 5, it will be seen that as the pawl pins 30 do not extend the full width of the pawl box 15, the effect of rotating the pawl box about the axis of the pipe is to cause the pawls 25 to slew slightly in a horizontal direction so that the pipe 4 is engaged by one of the edge portions 27 of the pawl 25 only. This engagement, coupled with the weight of the jacking assembly, is sufficient to prevent vertical descent of the assembly down the pipe but, if the jacking assembly 15 continues to be rocked about the pipe 4 the engaging corner portion 27 prescribes a downwardly spiralling path at an angle of about 15° to the horizontal. Thus the jacking assembly can be lowered by disengaging the top pair of pawls 25 and holding them disengaged by securing the switch arms to the catches 36 so that the jacking assembly weight is carried by the lower pair of pawls only. By twisting the jacking assembly back and forth around the pipe it can be spiralled down the pipe by one person in a controlled manner and if the assembly is let go, the pawls reassume their operating positions on the outside of the pipe 4 and prevent the assembly from falling further.

FIRST MODIFICATION OF PREFERRED EMBODIMENT

Figure 7:
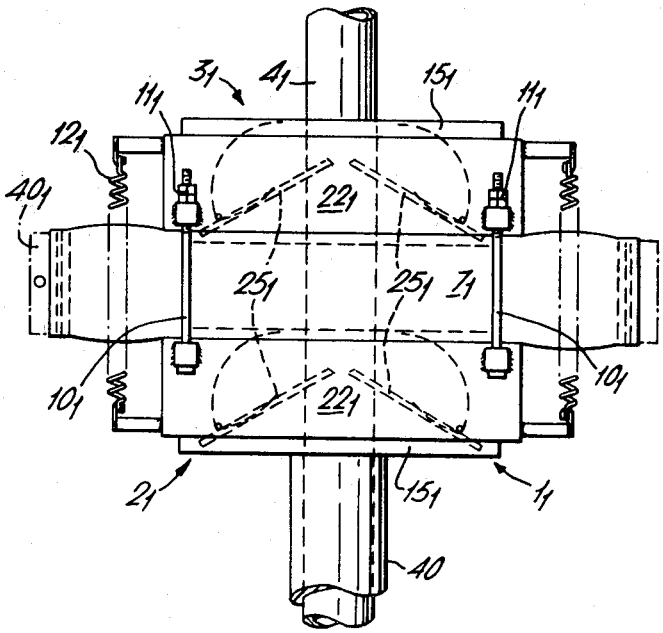
FIG. 7 shows the assembly of FIGS. 1–6 turned upside down and used to draw the inner of two telescopically arranged pipes out of the outer pipe on which the assembly rests, in order to form an expanding pier.

FIG. 7 shows a telescopic strut or pier utilising the jacking assembly of the previous figures and which is turned upside down. The part of the jacking assembly of FIG. 7 corresponding to those of earlier figures are similarly referenced but with the suffix 1 applied to their numerals.

The expanding pier has the pipe $4_1$ telescopically arranged inside a slightly wider pipe 40. The part $2_1$ of the jacking assembly, as a result of it being turned upside down, rests on the top rim of the pipe 40 and the pawls $25_1$ are inclined upwardly towards the pipe $4_1$ as is clearly shown in FIG. 7.

When the hose $7_1$ is expanded, the engagement of the part $2_1$ of the assembly with the top of the pipe 40 prevents it from moving downwardly, and the pawls $25_1$ of the [part $3_1$] *Parts $2_1$ and $3_1$* being inclined upwardly against the wall of the inner pipe $4_1$, prevent slippage there between. Expansion of the hose $7_1$, is therefore accompanied by upward movement of the part $3_1$ together with the pipe $4_1$. The pier therefore is expanded through a step determined by the available lengths of the bolts $10_1$.

At the end of the expansion step, the hydraulic pressure in the hose $7_1$ is relieved so that the spring $12_1$ pull the part $3_1$ back down the pipe $4_1$ until the two pawl boxes $15_1$ are again in contact. This return stroke of the part 3, is not accompanied by the downward movement of the [pupe] *pipe* $4_1$ as it is held in relation to the lower pipe 40 by the lower pair of pawls $25_1$. The readmission of water under pressure to the hoses of the jacking assembly causes it to expand the pier by a second step.

The advantage of the expanding pier of FIG. 7 is that the hydraulic connections to the hoses do not move during the extension of the pier, whereas in the arrangement shown in the FIGS. 1-6, the hydraulic connections climb, with the jacking assembly, up the pipe 4.

When the load carried by the expanding pier has been raised to the required height, it can be transferred to a suitable support and the pawl switch arms operated to allow the pipe $4_1$ to descend back into the pipe 40 so that the jack is ready for re-use.

An important feature of the jacks of the invention is that, when operated in parallel, they have a self leveling ability. This is important when lifting heavy loads which are weak in bending strength, such as reinforced concrete.

At the present time a reinforced concrete floor of a building which is to be located above ground level, is often built at ground level and then raised. If the lift applied to the reinforced concrete does not remain constant at each point of lifting, the concrete is subjected to a bending [movement] *moment* and will crack. In practice, is is not possible to guarantee that the weight of the concrete will be evenly distributed between the lifting points because inevitably some movement of the supports occurs. For this reason the thickness of the concrete has to be increased to prevent it breaking up with the uneveness of the distribution of lift anticipated during normal lifting with cranes or individual manually-controlled jacks. The additional concrete which must be used to enable lifting to take place safely, is expensive and increases the overall weight of the structure unnecessarily. Even then it is common-place for concrete floors lifted into position to be found to be cracked in the corners, and, in practice, this cracking is ignored.

The self-balancing ability of the jacking assembly of the invention, when used in parallel with others, enables it to lift a reinforced concrete floor slab with a guaranteed maximum deflection. In consequence, it can be more cheaply manufactured than is at present possible and the invention therefore facilitates the use of the relatively safe technique of building parts of a structure at ground level and then raising them into the operating positions when finished.

Figure 8:
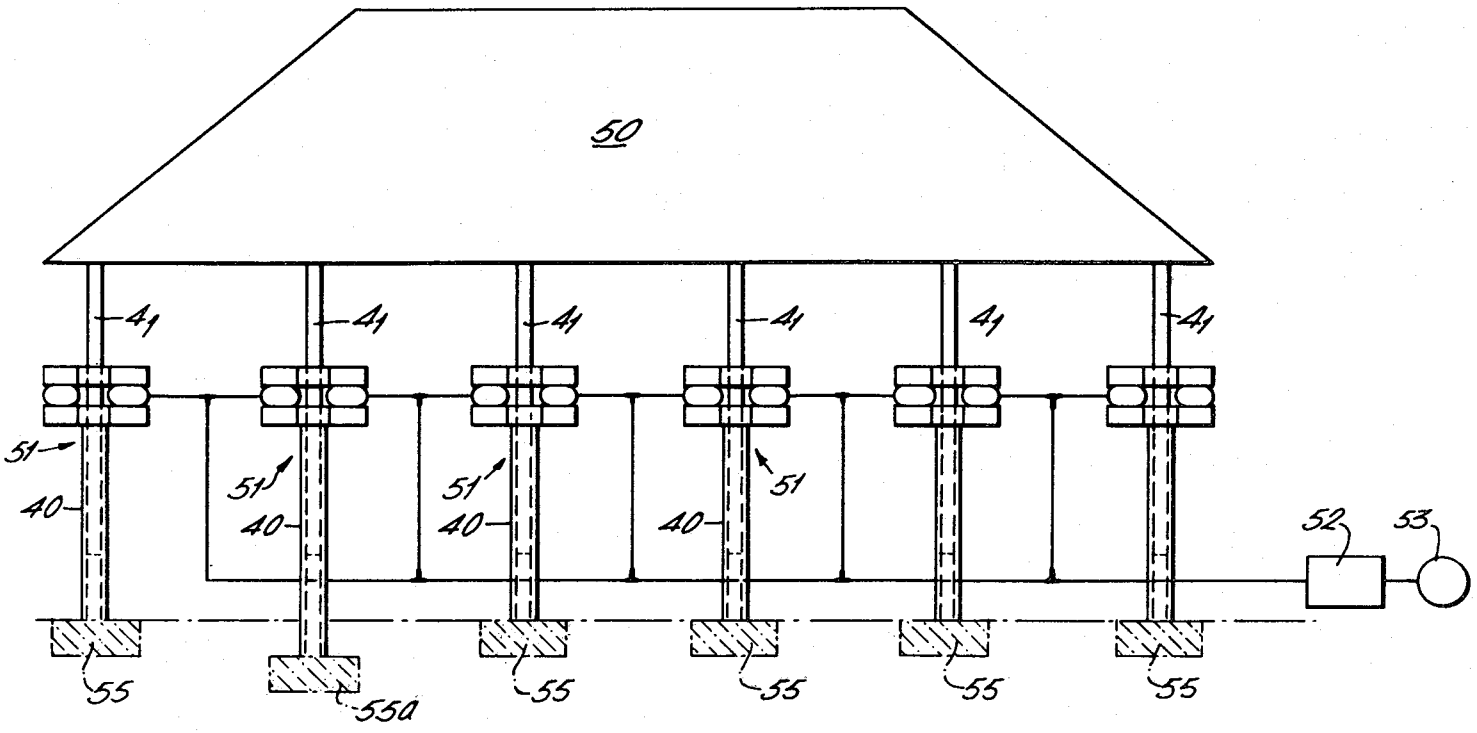
FIG. 8 illustrates how the self-levelling property of the jacking assembly can be used to maintain level a load being lifted despite subsidence of one of the foundations supporting it during lifting.

FIG. 8 illustrates diagrammatically a heavy load 50 being lifted by six telescopically arranged piers 51 of the type described with reference to FIG. 7. The same references are used in FIG. 8 as in FIG. 7. A load may be a concrete block although, in the diagrammatic view shown in FIG. 8 it is a house roof.

The hoses of the jacking assemblies are connected in parallel so that they are pulsed together by hydraulic pressure which is regulated by a controller 52 arranged to one side of the load 50, and generated by a water pump [53] *52* driven by an electric motor [54] *53*. For convenience only six piers are shown but it will be understood that many more may be provided.

The outer pipe 40 of each pier rests on a foundation 55. These are shown at ground level with the exception of the foundation 55a which it is assumed has subsided a short distance during the previous lifting stroke of the jacking assembly. The subsidence distance is, of course, greatly exaggerated in FIG. 8 because it cannot be greater than the stroke length of the jacking assembly, as otherwise the only load on it would be that of the pipe 40 and the jacking assembly in an unloaded condition. The effect of the subsidence of the foundation 55a, which would normally not be more than $\frac{1}{4}$ inch, is to reduce the share of the load carried by the associated jacking assembly. This load reduction is associated with a slight increase in load on all of the other jacking assemblies.

During the next hose expansion step of the jacking assemblies, the load on the subsided pier is less than on all of the other piers. Therefore, during the expansion of the hoses, the pair of hoses associated with the subsided pier will expand faster than the other hoses because such expansion is occurring against a smaller downward thrust. The effect of this is that the subsided pier is [expanded] *extended* faster than the others until the load is once again shared equally between them. There is thus a self-levelling effect on the roof provided that the hoses are not expanded to an extent that a set of stops, which limit the extent of separation of the two parts, limits the expansion of the hoses and forces all the assemblies to execute the same length of stroke. The system shown in FIG. 8 has been shown in practice to be able to lift a roof weighing between four and six tons 15 feet with less than $\frac{1}{4}$ inch mis-alignment at the end of the total lift as compared with what it was at the beginning.

Figure 16:
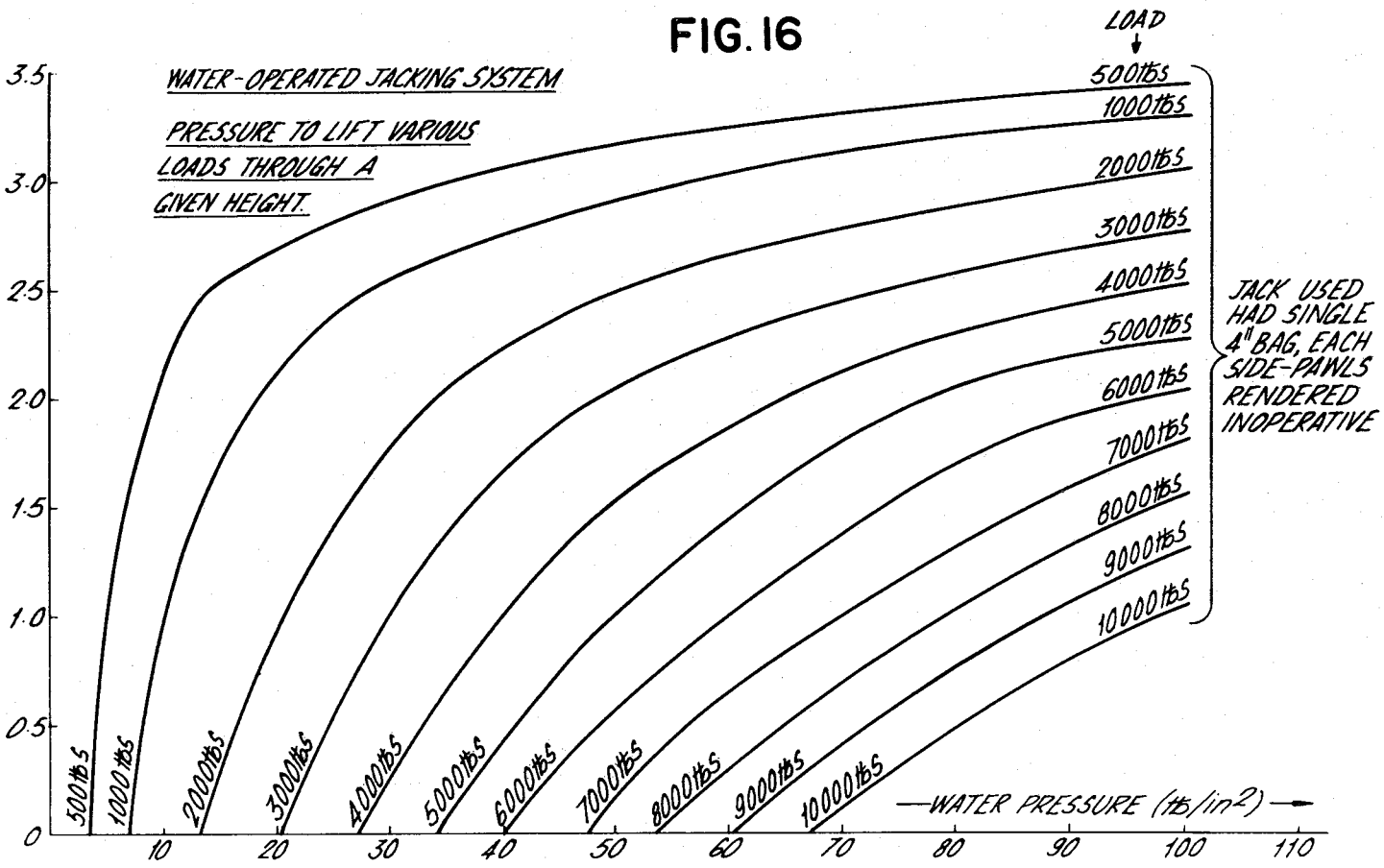
[FIGS. 16 to 18 show comparatively, operating curves of the jack of the invention and a conventional piston and cylinder jack;]

It will be appreciated that if the jacks of the invention were replaced by high-pressure piston and cylinder jacks, the same effects are not obtained. The conventional hydraulic jack using a piston and cylinder unit will, if connected in parallel with the other similar jacks each carrying a different part of the same load, alter the position of the load until it is equally divided between the jacks, i.e. each jack is identically loaded. One can counteract this, of course, by providing each jack with a stop to limit its extension. The jacks most lightly loaded then abut their stops first. Increasing the hydraulic pressure would then allow the remaining jacks to reach their stops later. However a feature of the piston and cylinder jack is that the thrust it exerts varies linearly, with the hydraulic pressure applied [as shown in FIG. 16 in the curve AB]. As the loading applied to each jack of a set supporting a roof is never exactly the same as the loading applied to the other, one must either vary the hydraulic pressure applied to each jack individually, if it is to go up the same step as the others, which is not practical, or increase the hydraulic pressure after some of the jacks have reached the ends of their upward strokes and are abutting their stops so that the remainder, more heavily-loaded jacks, carry out the same stroke. This technique involves a considerable amount of tilting of the load during each step and is also not practical, unless bypass valves and circuits are provided on the jacks, because the effect of increasing the hydraulic pressure inside a fully extended jack can damage it, bearing in mind that each jack may be lifting 10,000 lbs or more and using high hydraulic pressures.

Figure 9A:
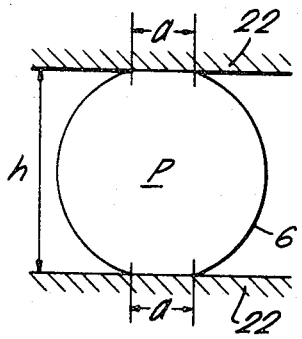
FIG. 9, is a cross-section through an inflatable bag of the jacking assembly at two stages of inflation in order to explain, more clearly, the self-levelling property of the jacking assembly.
Figure 9B:
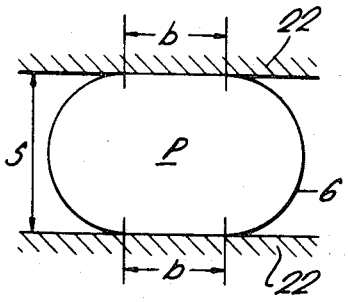
Figure 18:
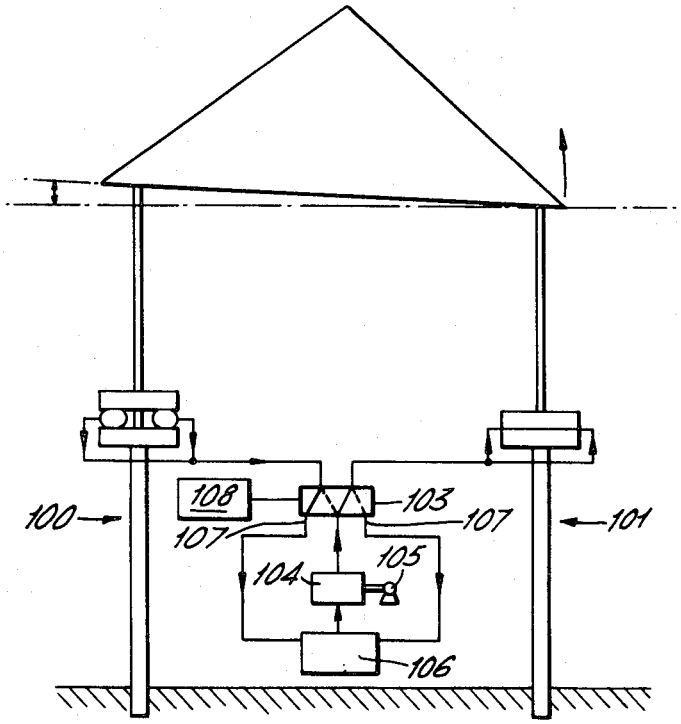
Figure 19:
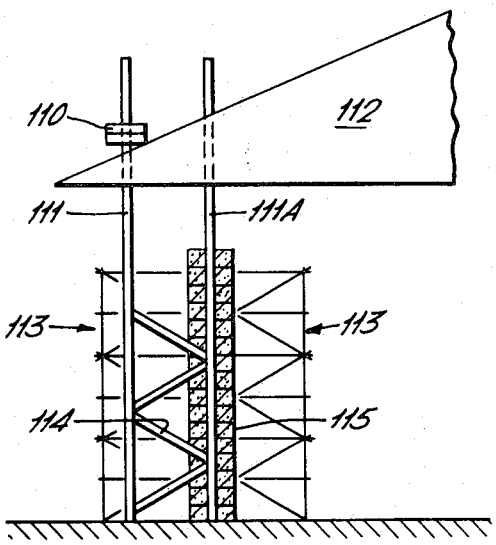
Figure 20:
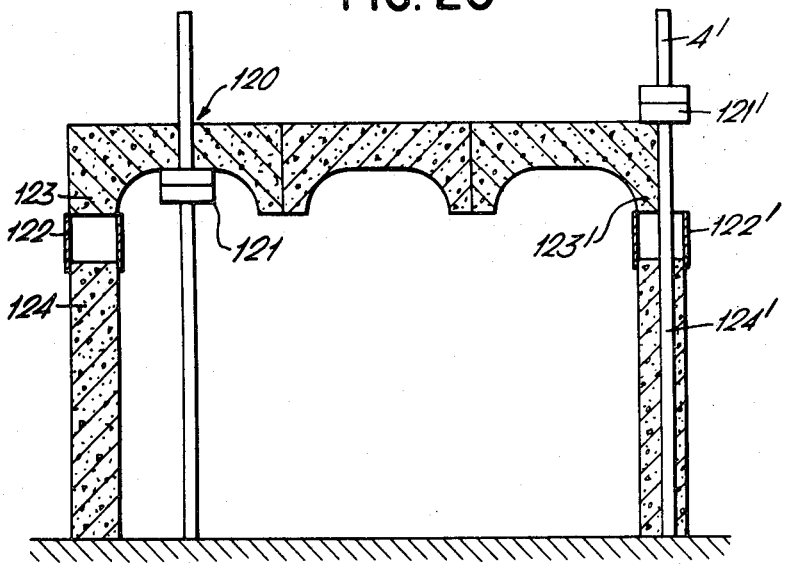
Figure 21:
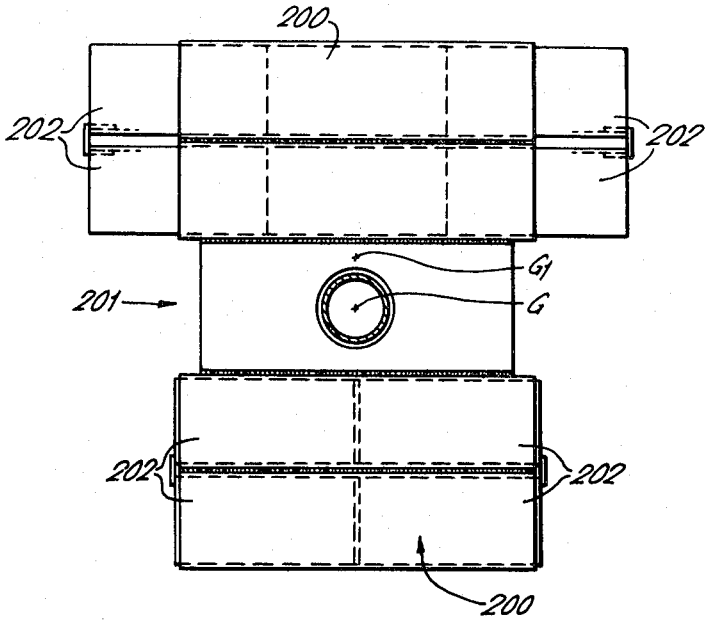
Figure 22:
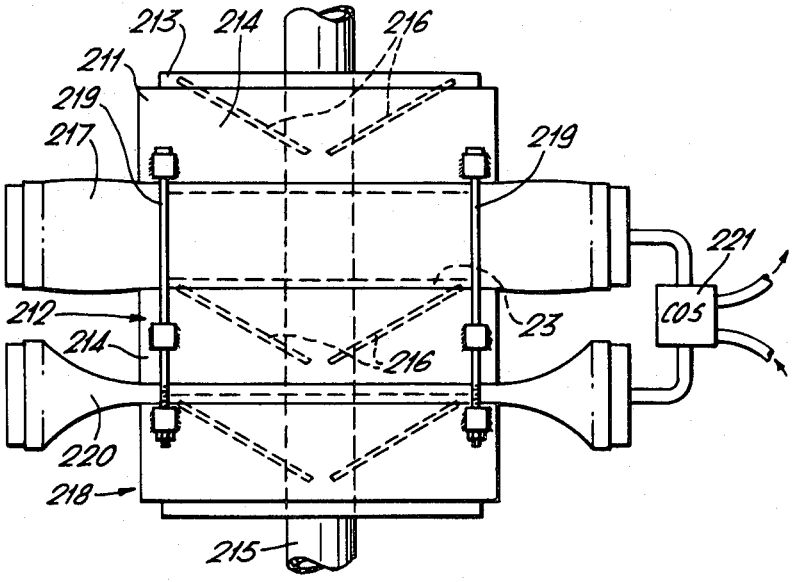

The jacking assembly of the invention does not have the above disadvantage as will now be explained with reference to FIG. 9. As is apparent from this figure, the areas of the hoses in contact with the platens 22 [diminishes] *diminish* non-linearly as the lifting stroke of the jack progresses (FIG. 18) with a commensurate reduction in the [rate of increase of the] upward thrust. Thus, if the hydraulic pressure is increased, straining of the mechanical parts of the jack is avoided as the hose assumes a slightly more rounded shape. This reduces the upward thrusting areas of the hose so that there is a negligible increase in upward thrust. In practice the jacking assemblies are operated between almost complete flattening of the hose, and expansion of the hose to about five sixths of the diameter. [When] *Once* this expansion is obtained, negligible further increase in upward thrust is obtainable. The pressure of the hydraulic system can then be increased so that other jacking assemblies can complete their strokes without straining the mechanical connections of the jacks already at the ends of their strokes.

It will be appreciated that the jacking assemblies shown in FIGS. 1 to 6 have the same advantages when operated in parallel, as the jacking assembly described in reference FIGS. 7 and 8. However, they have yet a further advantage when lifting a roof. The arm 16, shown in FIG. 1, is tied at each end to a wire fixed to the roof. If the roof is sucked upwards by windforces, the upward force is applied to the end of the arm 16 and cants the upper part 2 of the jacking assembly sideways at right angles to the direction of the pawls. This canting movement causes the corner edges of the circular hole in the pawl box 15, through which the pipe 4 passes, to bite into the wall of the pipe and resist upward movement of the jacking assembly. Although ties to the ground may also be provided for the roof, they have been found to be unnecessary as the locking effect obtained by pulling the arm 16 upwards is sufficient to resist very strong upward forces on the roof.

SECOND MODIFICATION OF PREFERRED EMBODIMENT

Figure 10:
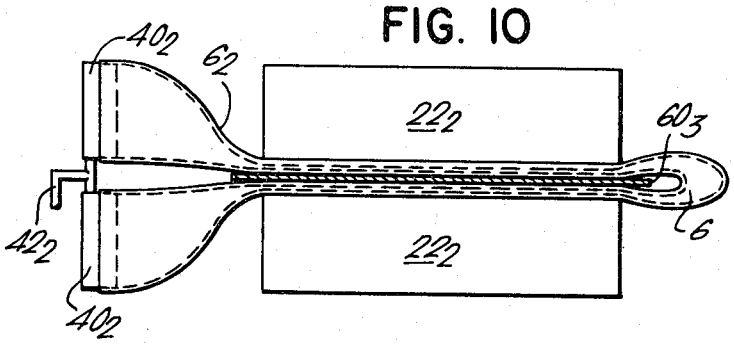
FIG. 10 shows in simplified form a modification of part of the assembly to increase the height of the stroke or lift of the jack.
Figure 12:
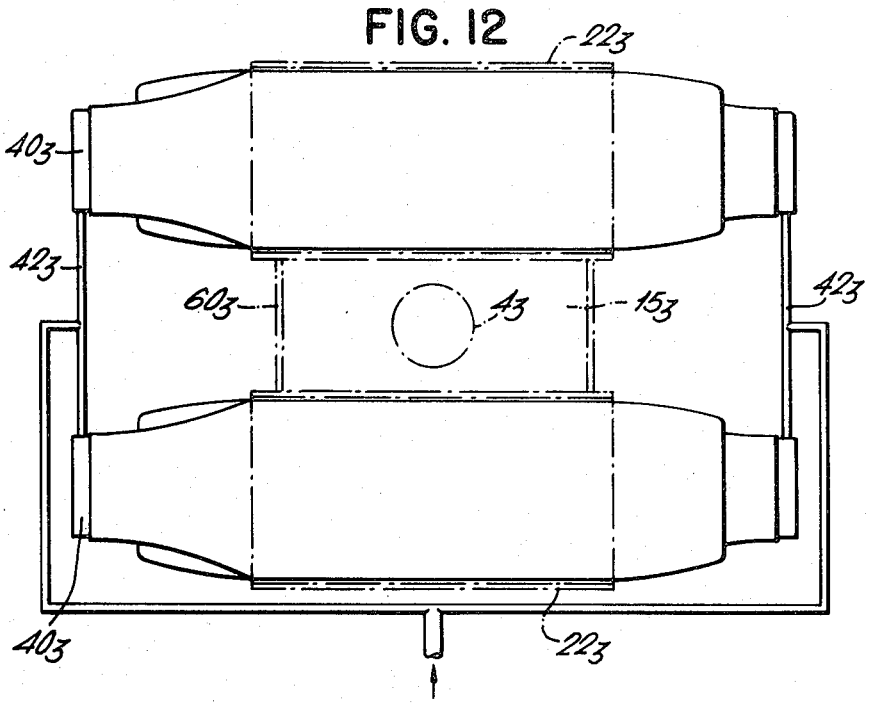
FIG. 12 is a simplified plan view of a jacking assembly incorporating the modification of FIG. 11, and shows hydraulic connections to the inflatable hoses.

FIG. 10 shows a way of doubling the lift obtained by the hose. For [somplicity] *simplicity*, only two platens $22_2$ are shown and a length of hose $6_2$ is shown doubled back on itself between them. Hydraulic connections to the hose are made at $42_2$ joining the two cups $40_2$. A plate $60_3$ is sandwiched between the two overlapping portions of the hose $6_2$ so that they do not roll over one another when dilated, and the plate, in plan, has the shape illustrated in FIG. 12 at $60_3$ and fits between the lower and upper parts of the jacking assembly with the pipe, engaged by the pawls, passing through a hole in the centre of the plate $60_3$. Thus, when the plate $60_3$ is incorporated into the jacking assembly, its opposite sides lie between the two pairs of platens. The plate $60_3$ is centrally apertured to accommodate the pipe $4_3$ (see FIG. 12).

A U-shaped copper tube 61 lies in the return bend of the hose in FIG. 10, and is positioned by cords which extend through the hose to the closure cups $40_2$. These cords prevent the tube 61 displacing so that when the hoses $6_2$ are collapsed hydraulic liquid admitted to it is evenly distributed between both halves of the hose $6_2$.

THIRD MODIFICATION OF PREFERRED EMBODIMENT

Figure 11:
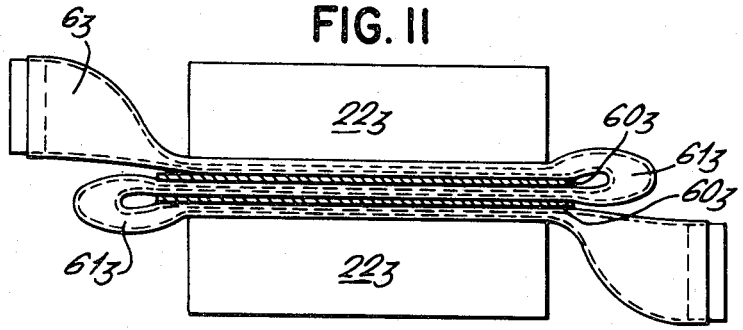
FIG. 11 shows an alternative arrangement to that shown in FIG. 10, in order to increase the height of the lift of the jack and its speed of operation.

FIG. 11 shows a method of increasing the lift still further. Here the hose $6_3$ is doubled back on itself twice so that three times the lift is obtained. The two platens between which the lift is exerted are shown at $22_3$, and two plates $60_3$ are used to keep the horizontal hose sections separate from one another. The advantage of the arrangement shown in FIG. 11 is apparent from FIG. 12 where the hydraulic connections are illustrated. It will be seen from this figure that hydraulic fluid can be admitted conveniently from both ends of the two hoses of the jacking assembly so that a relatively large lift is obtained with little additional apparatus or piping to the hoses being necessary.

Figure 15:
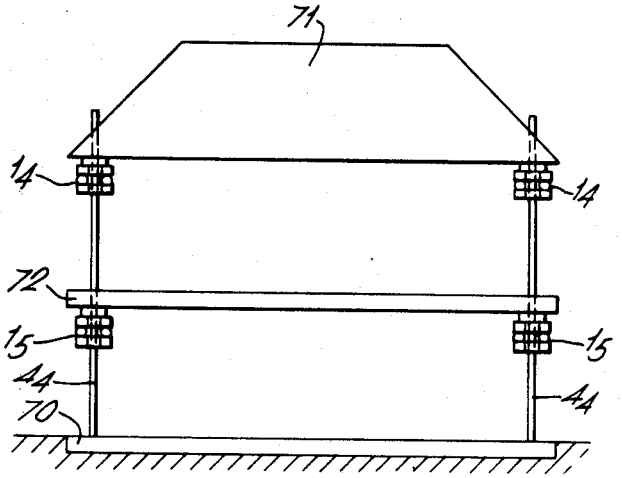
FIG. 15 shows a stage in the construction of a two-storey house.

FIG. 15 shows the application of a number of jacking assemblies as shown in FIGS. 1 to 6, to the construction to a two storey house. FIG. 15 is extremely diagrammatic. The house is constructed by first building its foundation 70 and then building, at ground level, the roof 71 on top of the foundation. An array of pipes $4_4$ are mounted on the foundation 70, two of these pipes being shown, and the jacking assemblies $1_4$ are then used to raise the roof 71 to the level of the first floor.

The first floor, referenced 72 is next constructed at ground level under the protection of the roof 71. When the first floor is completed, it is mounted on a further set of jacking assemblies $1_5$ and these assemblies are identical to and connected hydraulically in parallel with the assemblies $1_4$. Both sets of assemblies are operated in unison so that the roof 71 and the first floor 72 are raised simultaneously to their required positions. The ground floor of the house can then be constructed on the foundations 70 and the walls put in if this has not already taken place. As the jacks have [the] *an* identical stroke, the first floor and the roof of the house can be raised simultaneously while maintaining the spacing between them. Indeed, a multi-storey building is capable of being constructed using this concept. As an alternative to this system of building, one set only of jacking assemblies could be used. The roof is first raised to its desired spacing from the floor beneath it which is then constructed, with the walls between the floor and the roof, at ground level. The jacking assemblies are then lowered so that the weight of the roof is carried by the walls. The jacking assemblies are next secured to the floor from above, and the structure comprising the roof, first floor and intervening walls, is raised bodily to its required position. The floor beneath together with its side walls can be constructed and the sequence repeated to build a multi-storey building. This system of construction is particularly well suited to buildings having reinforced concrete floors.

Figure 17:
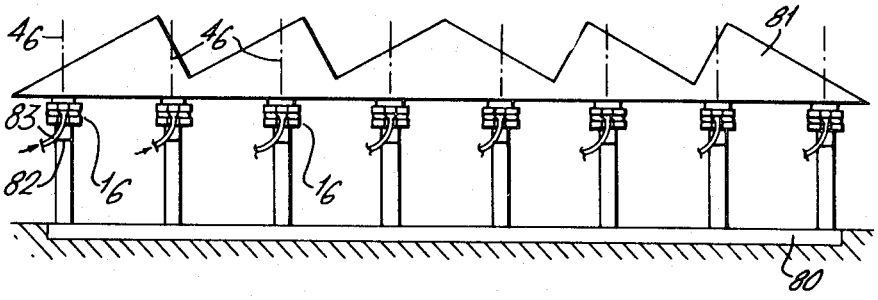

FIG. [19] *17* shows the construction of a very large building such as a factory, warehouse or railway station. The building has its foundations laid first, as shown at 80. A roof, which may be reinforced concrete, is then constructed at ground level on the foundations. Building a roof at ground level has the advantage that curing of the concrete is better because the temperature and humidity of the environment in which the concrete is setting, can be more easily controlled at ground level. This is particularly important in cold climates. The roof is referenced 81 in FIG. 17 and is shown lifted half way to its operating position.

An array of vertical pipes $4_6$ passes through the roof and each has mounted on it a jacking assembly $1_6$. These are each located beneath the roof and carry beneath them a slip former 82 surrounding the pipe $4_6$. Concrete is admitted to the slip former 82 by means of a lateral pipe system 83.

When the roof 81 has been constructed, it is gradually lifted up the pipes $4_6$ by simultaneous operation of the jacking assemblies $1_6$ associated with them as is described with reference to FIG. 8. As the roof is slowly raised, concrete is admitted to the slip formers 82, and this concrete has quick drying characteristics so that as the roof ascends under the control of a timer controlling the lifting system, the concrete hardens inside the slip formers 82 to form a casing surrounding each of the pipes $4_6$. Thus as the roof 81 rises, pipe reinforced concrete pillars are progressively formed beneath it by the slip formers 82. The walls of the structure may finally be built into position between the reinforced pillars, and after transfer of the weight of the roof to the pillars, the remaining portions of the piping $4_6$ can be cut away and the jacking assemblies $1_6$ and slipformers 82 removed.

SECOND EMBODIMENT

Figure 13:
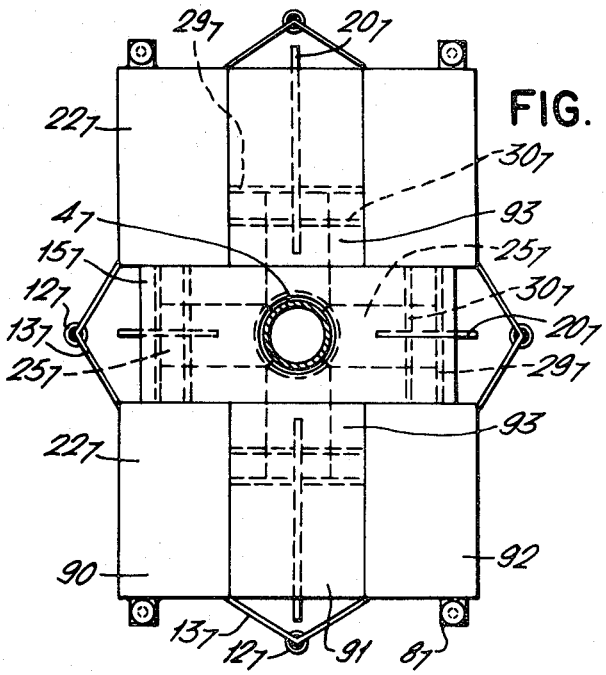
FIG. 13 is a plan view of a further embodiment of jacking assembly used to lift heavier loads than is possible with the assemblies shown in FIGS. 1–6.
Figure 14:
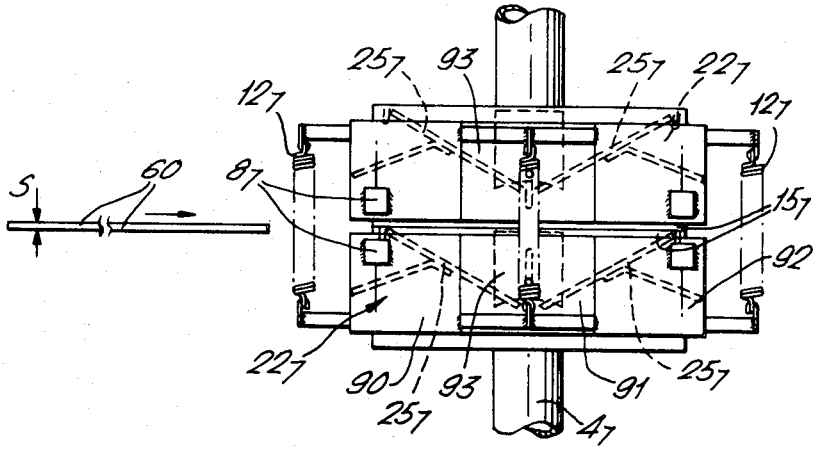
FIG. 14 is a side view of FIG. 13, greatly simplified and shows a packing plate used to vary the lift of the jacking assembly.

FIGS. 13 and 14 shows a modification of the jacking assembly shown in FIGS. 1 to 6, which is particularly well suited to lifting heavy loads such as concrete. The jacking assembly is basically the same as that shown in FIGS. 1–6 except that the platens $22_7$ are formed by three metal tubes of rectangular cross section projecting at right angles to the sides of the pawl boxes $15_7$. These tubes are referenced 90, 91 and 92 in FIGS. 13 and 14. The wall of the pawl box facing the tubes 91 is windowed and the parts are arranged in a cruciform pattern with the pawls $25_7$, within the pawl box, arranged at right angles to similarly mounted pawls 93 arranged within the tubes 91 and projecting through the windows of the pawl box into engagement with the pipe $4_7$. As there is a degree of overlap between the curved corner edges of the pawls which grip the pipe $4_7$ the pawl pair 93 is arranged to grip the pipe $4_7$ about ½ inch above the pawl pair $25_7$.

The advantage of the cruciform arrangement of pawls associated with each of the two parts of the jacking assembly is that twice the resistance to downward movement of each part of the assembly is obtained together with a balanced application of forces of the wall of the pipe $4_7$. Any tendancy for the pipe to be compressed from a circular cross-section to an eliptical cross section under heavy loads, and caused by one set of pawls, is resisted by the corresponding set of pawls arranged perpendicularly thereto.

The way in which the pawls are mounted in the pawl boxes and the tubes 91, is identical to that shown in FIGS. 4 and 5 and will not be again described. However, the brackets $13_7$ are duplicated at the ends of the tubes 91 so that each jacking part has four brackets. Likewise the springs $12_7$ are duplicated as is clearly shown in FIG. 13. As is clear from this figure the switch arms associated with the individual pawls project from the ends of the pawl box $15_7$ and also through slots provided in end plates covering the exposed ends of the tubes 91 so that individual disengagement of the pawls from the pipe $1_7$ is possible.

FIRST MODIFICATION OF SECOND EMBODIMENT

FIG. 14 shows a plate 60 which can be placed and appropriately fixed by a bolt or other attachment to the top surface of the platen $22_7$ or between the pawl boxes in order to vary the spacing between the two platens $22_7$. This facility can be useful for reducing the lift of the individual jacking assemblies.

FIG. [20] *18* shows how the speed of lifting of a house roof may be doubled. Each side of the roof is supported on a line of jacking piers as described with reference to FIG. 7. One pier of the first line is shown at 100 and the corresponding pier of the second line is shown at 101. The hoses of the first line are connected hydraulically in parallel to receive water under pressure from a change-over valve 103 which is supplied with water from a pump 104 driven by a motor 105. The pump has its suction inlet connected to a water reservoir tank 106 which is fed with water exhausting from two exhaust ports 107 of the change-over valve 103. A timer 108 operates the change-over valve so that it simultaneously connects, in alternation, one line of piers to receive water from the pump while providing exhaust connections for enabling the water in the hoses of the other line to flow into the reservoir 106. When the system of FIG. [20] *18* is in use, first one side of the roof is jacked up 2½ inches and then the other side. The advantages obtained are that the pump 104 operates continuously, instead of intermittently. The hoses of one set of piers are collapsing while those of the other set of piers are dilating, a closed hydraulic circuit with a relatively small reservoir is all that is required. [The speed of lifting can be increased because the load to be lifted during each lifting stroke is halved.]

At the end of the lift, the walls can be erected and, if necessary, capped with wet cement onto which the roof is lowered to form an imprint. This is carried out by inflating both sets of hoses simultaneously so that the entire weight of the roof is carried by them. The upper set of pawls 25 (FIG. 7) can then be disengaged from the pipe 4, so that, on controlled release of the hydraulic pressure in the hoses, the roof gently subsides onto the wet cement. Once the imprint of the roof seating is made in the cement, the roof can be raised again and lowered permanently on to the cement after it has set. In this way an even distribution of the roof weight on the walls is assured and cracking of the brickwork—which is commonplace when *a* separately constructed roof is lowered on to it does not occur. Once the roof weight is carried by the walls, the telescopic piers can be removed. The jacking assembly described is capable of providing a horizontal traction as well as a vertical lift and may be used to push or pull a load. Currently available hydraulic piston and cylinder jacks for house lifting use hydraulic pressures of several thousand pounds per square inch, whereas the jacking assemblies above described use low pressure of only about 28 to 160 lbs per square inch, although it may be readily adapted to high pressure working, if desired, simply by increasing the strength of the hoses.

FIG. [19] *17* shows one way of incorporating the pipes of the jacking assembly usefully into the structure of a building which it is being used to construct. Both the pole-climbing jack assembly of FIGS. 1 to 6 and the telescopic pier of FIG. 7 can be likewise used.

FIG. [21] *19* shows a pole-climbing jack assembly 110 ascending a pipe 111 composed of pipe sections having spigot and socket connections enabling them to be fitted into one another as the building grows. The building comprises a roof 112 constructed at ground level and which provides protection for personnel working beneath it. The weight of the roof 112 is carried by a number of jack assemblies, such as the jack assembly 110, mounted above the roof. As the roof is raised, the walls 115 of the building are constructed of brick, steel or combination. A second pipe 111A alongside the pipe 111, is built into the wall 115 to strengthen it and is attached by braces 114 to the pipe 111 and to *scaffolding* 113. In this way, the scaffolding *113* and pipe 111A braces the pipes 111 of the jacking assembly against lateral deflection.

In the case of the telescopic expanding pier, the outer pipe 40 (FIG. 7) can have its foot cemented into the concrete foundations of the building being erected so that no sideways stability problems occur. The roof or other structure being lifted is supported, temporarily, by a prop, when it is at the required height and the jacking assembly is no longer required. An attachment plate fitted to the roof and engaged by the top of the pipe 4 (FIG. 7), is disengaged from the pipe, which is then lowered into the outer pipe 40 by a suitable tackle from the attachment plate. The upper and lower parts 2, 3 of the jacking assembly are then removed. The inner pipe 4, is then drawn out of the outer pipe 40 by the tackle and connected permanently, for example by welding, to the attachment plate. The upper rim of the outer pipe 40 is also welded permanently to the inner pipe [40] *41* so that the two pipes form a rigid vertical structure connected securely to the roof at its top end and bedded in the foundations of the building at its lower end.

FIG. [21] *20* shows very diagrammatically a concrete roof constructed at ground level of inverted arches of waffle construction, and being lifted into position in two different ways. In the first way, the pipes of the jacking assemblies pass through holes in the waffle, as shown at 120, with the jack 121 itself, located beneath the arch as shown on the left hand side of the FIG. 1. A slip former 122 is attached beneath one leg 123 of the roof arch and is fed with concrete so that as the roof ascends, a concrete pillar 124 is formed simultaneously by the slip former 122 to support the weight of the roof. The pipe of the jacking assembly is composed of sections having telescopically interfitting spigots and sockets at their ends. A considerable height of roof lift can be achieved in this way and the jacking assembly is easily removed when the desired height of the roof is attained.

The right hand side of FIG. [21] *20* shows an alternative way which does not involve perforating the roof and provides reinforcement for the pillars. Corresponding parts to those already described are similarly referenced but are primed. The roof is lifted from above by the jacking assembly the pipe of which extends down the end face of the roof alongside the leg $123_1$. As the lift proceeds, the slip former $122^1$ forms a concrete case around the pipe so that the resultant support pillar $124^1$ is of reinforced construction. On completion of the lift, the projecting pipe section is cut off with the lifting parts of the jacking assembly and weight of the roof is carried by the slip-formed pillar $124^1$.

The above described jacking assemblies are versatile in use and, without modification, can be used as pole-climbing jacks or for telescopically arranged expanding piers. They can work in dirty, gritty or greasy conditions which is not practical with [a] moving seal jacks utilizing a piston in a cylinder, and can be serviced by a screwdriver alone. Finally, by extending the lengths of the hoses and platens the lifting capacities can be easily varied.

Figure 23:
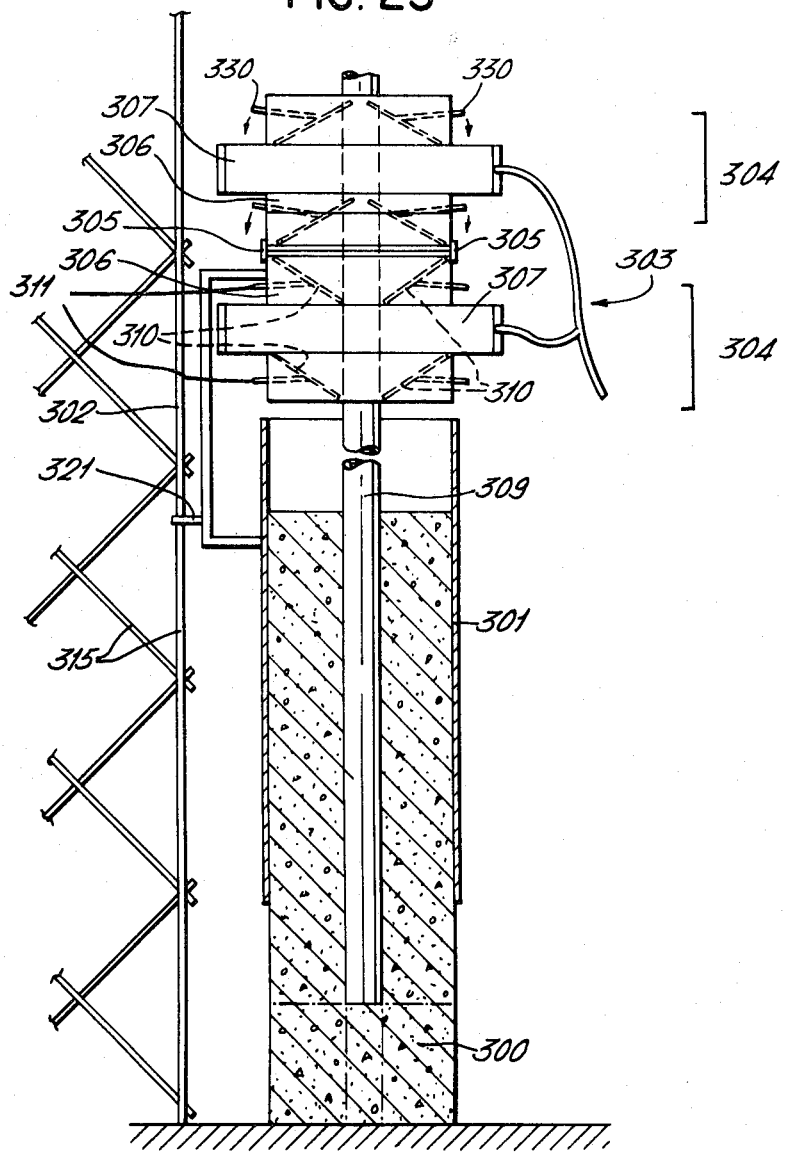

FIG. [23] *21* shows how a platen 200 of a jacking assembly 201 may be provided with telescopically retractable ends 202 to vary the length of it in contact with the hose and thus the upward thrust exerted by it on the load when the hose expands. Not only can the upward thrust [for] *exerted by* a jacking assembly subjected to a given hydraulic pressure be finely adjusted in this way, it also allows the centre G of upward thrust on the platen to be moved (to $G_1$ in the figure) to compensate for eccentric loading of the jacking assembly with an off-centre load. The pawl box and other parts of the assembly of FIG. 23 are similar to those shown in the jacking assembly of FIG. 3.

Also, the lifting capacities can be varied by reducing the lifting stroke as is apparent from the characteristic curves of FIG. [18] *16*.

FIG. [24] *22* shows a variation of previous embodiments which all show the recovery stroke of the two parts of the jacking assembly being controlled by springs. In FIG. [24] *22*, instead of springs, a short hose section [210] *220* is used. The jacking assembly comprises an upper part 211 and a lower part 212 which are each equipped with pawl boxes 213 as is previous embodiments, and with platens 214 extending horizontally at each side of a pipe 215 up which the jacking assembly is to climb. The two pawl boxes 213 contain pawls 216 which slope downwardly towards one another and grip the wall of the pipe 215. Between the two pairs of platens 214 are located respective hose sections 217.

Mounted beneath the lower part of the jacking assembly is a carrier 218. As shown, this is identical to the other parts of the jacking assembly and likewise contains pawls but these are not strictly necessary. The carrier 218 is connected by steel bars 219 to the upper part of the jacking assembly. A second expandible hose section 220 is located between the platens of the carrier 218 and the platens above. The hose 220 shown is of the same length as the hose 217. However it would normally be substantially shorter as it does not participate in the jacking up of the load but serves only to expel water forcibly from the hose 217 during the contraction stroke of the jacking assembly. The hoses 217, 220 are connected to a change-over valve 221 which is connected to an 80 lb/in$^2$ water pump.

The jacking assembly illustrated performs its working stroke by dilation of the hose 217. This forces the upper part 211 upwards so that the assembly commences to climb the pipe 215. At the end of the working stroke the switch 221 is operated, perhaps by a timer so as to be automatic, and the hose 217 is connected through the switch to exhaust and the hose 220 is dilated. This forces the lower part 212 upwardly from the carrier 218 to expel, forcibly, the water from the hose 217. As the thrust the hose 220 must exert to do this is very much less than the load on the jacking assembly, the hose 220 can, in practice, be very much smaller in length than the hose 217 although it should dilate to the same diameter.

FIG. [25] *23* shows the use of the invention in slip-forming. A concrete pillar 300 is poured by encasing its outline with a tubular slip former 301 suspended by ties 302 from a jacking assembly shown generally and diagrammatically at 303. The jacking assembly 303 comprises two assemblies 304 of the type shown in FIG. 6 but one of them is turned upside down with respect to the other and the neighbouring platens 306 of the two assemblies are fixed together by clamps 305.

Each assembly 304 has hoses 307 which are hydraulically connected in parallel with one other. The upper assembly 304 has pawls 308 which slope upwardly and engage a pipe 309 which is vertically mounted on the centre-line of the pillar 300 but is about six meters long.

The lower assembly 304 has pawls 310 which are held inoperative by the associated switch arms 311 which are held by catches (not shown).

Scaffolding 315 extends upwards alongside the position of the pillar 300.

FIG. [25] *23* shows the assembly 304 set to lift the pipe 309 from the centre of the last poured section of the concrete pillar 300. This is done when the concrete has become firm but is not yet sufficiently hard to prevent the pipe 309 from being extracted from it. The extraction may be assisted by prior sheathing the pipe 309 with a pair of semi-cylindrical thin plastics shells from which the pipe slips easily and which remain in the concrete. The shells are formed internally and externally with [circumferntially] *circumferentially* extending closely spaced grooves and ribs to provide grips.

Prior to lifting the pipe 309 the ties 302 are attached firmly to the scaffolding as at 321. The hoses 307 are then inflated. As the pawls 310 do not touch the pipe the lower hoses 307 does not do any work. However the hoses of the upper assembly cause the pipe 309 to be drawn upwardly out of the concrete 300 until only a short section of its length remains beneath the level of the top of the concrete 300. The extraction of the pipe takes place in steps as has already been described with reference to FIG. 7 above.

When the pipe 309 is raised to its new position it can be held in position by providing its lower end with outwardly sprung pawls which lock into the grooves of the plastics shells and are inclined so that they prevent its descent in much the same way as the inclinations of the pawls of the pawl boxes prevent descent of the jacking assembly.

As an alternative to providing bottom pawls on the pipe, sand may be poured through the interior of the pipe 309 to fill up the hole left by it in the concrete 300 so that the pipe 309 rests at its lower rim on the sand or [xement] *cement* to provide a firm base for it during the following lifting stage.

At the commencement of the following lifting stage the attachment 321 between the ties 302 and the scaffolding 315 is disconnected.

The pawls 310 of the lower assembly have their switch arms moved downwardly so that the pawls engage the wall of the pipe 309. The pawls of the upper assembly are then moved out of engagement with the pipe 309 by operating their associated switch arms 330 and the hoses 307 are then again pulsed.

The two lower sets of pawls 310 now operate as described above with reference to FIG. 6 when the hoses 307 are pulsed, to cause the assembly 303 to climb the pipe 309. As the assembly 303 ascends, it draws up the slip-forming casing 301 around the pipe 309 to a new position in readiness for pouring of the concrete of the next section. Before this takes place, two new plastics semi-cylindrical shells are placed around the pipe 309.

The above described technique allows a pillar to be poured in sections by a slip forming process without requiring unnecessary metal work to be locked in the concrete and which may have to be removed, by expensive hydraulically operated traction equipment, using current-day [proceedures] *procedures* which are both expensive and often unsuccessful Adjustment of the spacing between the two parts of the jacking assembly at the completion of the recovery stroke can be effected by placing adjustable stops between the pawl boxes. Such stops may comprise plates of varying thickness, as described and illustrated, or stepped wedges, or adjustable bolts screwed into one of the pawl boxes.

I claimed:

[1. A fluid operated jacking assembly suitable for moving a load, in steps, axially of an elongated member the assembly comprising:

two gripping parts adapted to be mounted at axially spaced positions on the member;

gripping devices mounted on each part and which grip the member in a way which allows relative axial movement in one direction only between the member and the parts;

fluid-pressure operated thrusting equipment for forcibly separating the two parts in response to the admission of a fluid under pressure to the equipment during a working stroke; and, recovery means for forcing the two parts towards one another to execute a recovery stroke which follows the working stroke;

in which assembly said equipment comprises a flexible, inflatable, but non-elastic bag means shaped whereby, as it dilates, it progressively reduces its area of contact with the two parts in a way which causes the ratio of the jacking thrust to fluid pressure to diminish progressively as the two parts of the assembly move apart.]

[2. An assembly as claimed in claim 1, in which said gas comprises tubular hose means having a longitudinal axis which lies in a plane perpendicular to the axis of the member, said hose means being distributed about said member axis and providing a thrust on the two parts which is symmetrical with respect to said member axis.]

[3. An assembly as claimed in claim 2, in which said tubular hose means comprises two short lengths of hose connected hydraulically in parallel and said parts of the assembly have respective pairs of platens, each of said hose lengths lying between two of said platens, and means for connecting said tubular hose means to said fluid under pressure which is attached to said hose means and is separate from said two gripping parts.]

[4. An assembly as claimed in claim 3, in which said hose lengths each have opposite end-portions which extend beyond the ends of said platens and each said platen is provided with adjustable extension means to vary the length of the platen in contact with the hose length.]

[5. An assembly as claimed in claim 4, in which said recovery means includes a coiled tension spring connected between the two parts.]

[6. An assembly as claimed in claims 1, including a carrier rigidly connected to one of said parts and lying on the opposite side of the other of said parts to said one part, and said recovery means comprises an inflatable element located between said carrier and said other part whereby inflation of the element forces said other part towards said one part to expel fluid from said bag means during said recovery stroke.]

[7. An assembly as claimed in claim 6, in which the inflatable element comprises a hose portion having a longitudinal axis lying in a plane perpendicular to the longitudinal axis of said member.]

[8. An assembly as claimed in claim 1, in which each of said parts comprises a pawl box defining aligned openings through which said member passes and having platens which extend laterally away from opposite sides of each said pawl box, said bag means comprises at least one tubular hose lying in a plane perpendicular to the longitudinal axis of said member and sandwiched between two of said platens, and said at least one tubular hose being removable from between the platens by axial displacement.]

[9. An assembly as claimed in claim 8, in which the pawl box contains pawls, abutment hinges, and springs which are provided for said pawls for urging them to positions at which their ends engage opposite sides, respectively, of the member at opposite positions, the lengths of said pawls being such that they make substantially the same acute angle with the longitudinal axis of the member, and each pawl being provided with a rigid switch arm extending through an opening in the pawl box and which is movable from outside the pawl box to disconnect the attached pawl from said member.]

[10. An assembly as claimed in claim 9, in which said pawls comprise flat steel plates each formed at one end with an arcuate sharp concave edge to grip the periphery of a cylindrical pipe member, an abutment wall in said pawl box, a linear abutment hinge formed at the opposite end of said pawl to said concave edge by the engagement of the pawl other end with the abutment wall, and slant-cut corner edges at said one end of said pawl; in which assembly the width of each of said pawl plates is sufficiently small for there to be a clearance between the sides of the pawl and the inside of the pawl box to enable said plates to slew during controlled lowering of the assembly, the pawl box being provided with catches for engaging said switch arms to hold the connected pawl in its member-disengaged position against the bias of the spring.]

[11. An assembly as claimed in claim 1, arranged in back-to-back combination with a second similar assembly, clamping means connecting together the adjacent gripping parts of the respective assemblies and the gripping devices of said assemblies being effective in opposite directions of movement respectively, control means being provided to enable the gripping parts of the two assemblies to be selectively effective, and the bag means of the two assemblies being connected for parallel inflation and deflation.]

[12. An assembly as claimed in claims 1, in combination with a pair of telescopically arranged pipes of which the smaller diameter pipe is engaged by the gripping devices while the larger diameter pipe provides a support for the assembly, whereby operation of the assembly extends the smaller diameter pipe in steps from the larger diameter pipe to provide a telescopically extendible strut.]

[13. An assembly as claimed in claim 1 including guides which prevent the two parts from twisting with respect to one another, and adjustable stops between the two parts which allow them to separate and come together to predetermined adjustable extents.]

[14. An assembly as claimed in claims 1, mounted on a vertical pole arranged parallel to other vertical poles each having a similar operating assembly mounted on it, the thrusting equipment of the assemblies being hydraulically connected for parallel operation in a closed water circuit which includes a pump and a reservoir tank.]

[15. An assembly as claimed in claim 13, and used with said other assemblies for lifting a roof, constructed at ground level, to a height at which the floor level beneath the roof and the walls which support the roof can be constructed under the protection of the roof, after which the assemblies are operated in unison to lower the roof onto the top of the wall.]

[16. An assembly as claimed in claim 1, in which the fluid pressure operated thrusting equipment comprises hose sections arranged one each side of the position of the longitudinal axis of the member and having their longitudinal axes arranged in a plane perpendicular to that of the axis, the hose sections being each doubled back on itself and around respective marginal portions of a separation plate which is freely moveable between the two parts and separates the two doubled-back portions of each hose section so that they do not bear on one another when dilated, means being provided for maintaining a fluid path between the two doubled-back portions of each hose section when the hose is flattened.]

[17. An assembly as claimed in claim 1 in which each part is of cruciform configuration when viewed in the direction of elongation of the member and is provided with two pawl pairs arranged perpendicularly to one another and being shaped to engage around the member at nearly the same position along its length so that the member, at that position, is subjected to substantially balanced, radially inwardly directed, thrusts from the pawls.]

*18. A fluid operated jacking assembly suitable for moving a load, in steps, axially of an elongate member having a substantially constant cross section, the assembly comprising:*

*said elongate member, two parts adapted to be slidably mounted at axially spaced positions on the member;*

*pawl devices mounted on each of said parts and engagable with the elongate member in a way which permits relative axial movement in one direction only between the elongate member and said parts;*

*fluid-pressure operated means for forcibly separating the two parts in response to admission of a pressurised fluid to said means during a working stroke, said means comprising at least one inflatable bag located between and in contact with the two parts and, in operation of the jacking assembly, adjacent the elongate member, the bag being flexible but non-elastic so that the area of contact of the bag with the two parts diminishes progressively with increasing admission of pressurised fluid and consequential dilation of the bag, and*

*recover means for forcing the two parts towards one another to execute a recovery stroke following the working stroke, and release of fluid pressure from said fluid pressure operated means.*

*19. An assembly as claimed in claim 18, in which said bag comprises tubular hose means having a longitudinal axis which lies in a plane perpendicular to the axis of the elongate member.*

*20. An assembly as claimed in claim 19, in which said bag comprises two lengths of hose connected hydraulically in parallel, in which said parts of the assembly have respective pairs of platens, and in which each of said hose lengths lies between two of said platens at opposite sides of the elongate member and with its axis in a plane perpendicular to the elongate member, and having means for admitting said pressurised fluid to said bag, said admitting means being attached to said bag and separate from two parts.*

*21. An assembly as claimed in claim 20, in which said hose lengths each have opposite end-portions which extend beyond the ends of said platens and each said platen is provided with adjustable extension means to vary the length of the platen in contact with the hose length.*

*22. An assembly as claimed in claim 21, in which said recovery means includes a coiled tension spring connected between the two parts.*

*23. An assembly as claimed in claim 18, including a carrier rigidly connected to one of said parts and lying on the opposite side of the other of said parts to said one part, and said recovery means comprises an inflatable element located between said carrier and said other part whereby inflation of the element forces said other part towards said one part to expel fluid from said bag during said recovery stroke.*

*24. An assembly as claimed in claim 23, in which the inflatable element comprises a hose portion having a longi-*

*tudinal axis lying in a plane perpendicular to the longitudinal axis of said elongate member.*

*25. An assembly as claimed in claim 18, in which each of said pawl devices comprises a pawl box defining aligned openings through which said elongate member passes and having platens which extend laterally away from opposite sides of each said pawl box, said bag comprising at least one tubular hose lying in a plane perpendicular to the longitudinal axis of said elongate member and sandwiched between said two parts, arranged to bear on said platen portions thereof.*

*26. An assembly as claimed in claim 25, in which the pawl box contains pawls, and springs which are provided for said pawls for urging them to positions at which their ends engage opposite sides, respectively, of the elongate member at opposite positions, the lengths of said pawls being such that they make substantially the same acute angle with the longitudinal axis of the elongate member, and in which each pawl is provided with a rigid switch arm extending through an opening in the pawl box which is movable from outside the pawl box to disengage said each pawl from said elongate member.*

*27. An assembly as claimed in claim 26, in which said pawls comprise flat steel plates each formed at one end with an arcuate, sharp concave edge to grip the periphery of a circular section said elongate member, and which assembly also comprises abutment walls in said pawl box, abutment hinges formed at the opposite end of each said pawl from said concave edge by the engagement of each said pawl opposite end with respective said abutment walls, and slant-cut corner edges at each said one end of said pawls; in which assembly the width of each said pawls is sufficiently small for there to be a clearance between the sides of each said pawl and the inside of the pawl box to enable each said pawl to slew during controlled lowering of the assembly, the pawl box also being provided with catches for engaging with said switch arms so as to hold the respective pawls in positions whereby they are disengaged from said elongate member during lowering.*

*28. An assembly as claimed in claim 18, arranged in "-back-to-back-" combination with a second similar assembly, clamping means connecting together the adjacent said parts of the respective assemblies, control means being provided to enable said parts of the two assemblies to be selectively effective, and the fluid pressure operated means of the two assemblies being connected for parallel inflation and deflation.*

*29. An assembly as claimed in claim 18, in combination with a pair of telescopically arranged pipes of which the smaller diameter pipe comprises said elongate member and is engaged by the pawl devices while the larger diameter pipe provides a support for the assembly, whereby operation of the assembly extends the smaller diameter pipe in steps from the larger diameter pipe to provide a telescopically extendible strut.*

*30. An assembly as claimed in claim 18, including guides which prevent the two said parts from twisting with respect to one another, and adjustable stops between the two parts which allow them to separate and come together to predetermined adjustable extents.*

*31. An assembly as claimed in claim 18, mounted on a vertical pole constituting said elongate member arranged parallel to other vertical such poles each having a similar operating assembly mounted on it, the fluid pressure operated means of the assemblies being hydraulically connected for parallel operation in a closed water circuit which includes a pump and a reservoir tank.*

*32. An assembly as claimed in claim 18, in which the fluid pressure operated means comprises hose sections arranged one each side of the longitudinal axis of the member and having their longitudinal axes arranged in a plane perpendicular to that of the axis, the hose sections being each doubled back on itself and around respective marginal portions of a separation plate which is freely movable between the two parts and separates the two doubled-back portions of each hose section so that they do not bear directly on one another when dilated, means being provided for maintaining a fluid path between the two doubled-back portions of each hose section when the hose is flattened.*

*33. An assembly as claimed in claim 18, in which each said part is of cruciform configuration when viewed in the axial direction of said elongate member and is provided with two pawl pairs arranged perpendicularly to one another and being shaped to engage around the elongate member at nearly the same position along its length so that the member, at that position, is subjected to substantially balanced, radially inwardly directed, forces from the pawls.*

* * * * *